Nov. 7, 1933.                A. A. SCHUPP                1,934,239
                   MAKING HOLLOW ARTICLES OF CAST METAL
                          Filed June 10, 1931

INVENTOR
ARTHUR A. SCHUPP
BY George B. Willcox
           ATTORNEY

Patented Nov. 7, 1933

1,934,239

UNITED STATES PATENT OFFICE 1,934,239

MAKING HOLLOW ARTICLES OF CAST METAL

Arthur A. Schupp, Saginaw, Mich., assignor to Fredericksen Company, Saginaw, Mich., a corporation of Michigan Application June 10, 1931. Serial No. 543,268

6 Claims. (Cl. 22—206)

This invention pertains to the art of making seamless hollow cast metal articles, such as balls and shells of various shapes and sizes.

An object is to provide, as an article of manufacture, a one-piece spheroidal hollow shell of cast metal possessing accurate rolling or rotating balance, seamless, smooth inside and out, devoid of the plugged holes through which core sand has been removed, and massive enough to safely withstand heavy external pressure.

An example of such an article of manufacture is the hollow cast metal ball of a large check valve. The geometrical center of a hollow check valve ball must quite accurately coincide with its center of gravity, at least within such practical limits of accuracy as are imposed by the service in which the ball is used. For instance, the ball should be in such good rotating balance that fluid passing through the valve will automatically turn the ball and thereby present various parts of its surface to the valve seat, to distribute the effects of wear equally over all parts of the ball's surface. A ball constructed according to my invention meets those requirements and by reason of its construction can be manufactured cheaply.

Another object of my invention is to provide a new process of manufacture that is relatively inexpensive, requiring a minimum of skilled labor, yet capable of being performed under conditions of mass production without producing rejects which were common under processes formerly employed on account of uneven wall thickness due to inaccurate core placement, and consequent faulty balance, and without the necessity of employing such manufacturing expedients as brazing, soldering or welding and without using any sand cores.

My claimed method consists in various manipulations of material and consecutive steps in a process which, for purposes of description, will be explained as applied to the manufacture of polished cast brass or bronze balls for check valves.

With the foregoing and certain other objects in view, which will appear later in the specification, my invention comprises the devices described and claimed and the equivalents thereof.

In the drawing Fig. 1 is a view of a completed ball embodying my invention.

Figure 1:
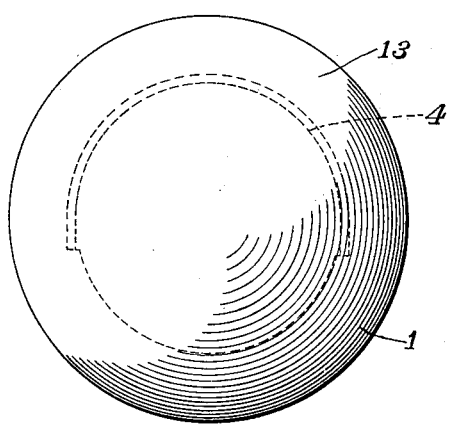
Figure 2:
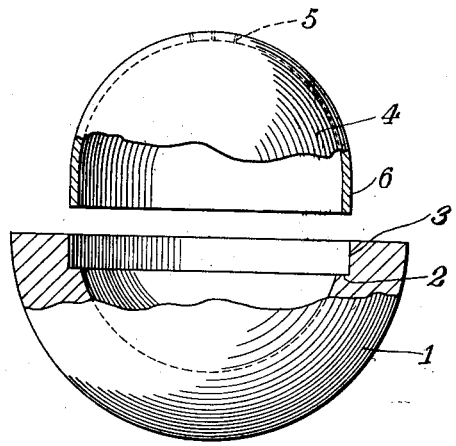
Fig. 2 is a side view, partly broken away, of the lower hemisphere of the ball, and, in detached relation, the sheet metal hemispherical shell employed in one step of the manufacture of the ball.

As is clearly shown in the drawing, numeral 1 indicates the lower hemisphere of a hollow ball made of cast metal, usually bronze, brass or any other suitable metal or alloy. This hemispherical member is produced by casting in a mold in the usual way. Its inner marginal wall is preferably counterbored to present an annular shoulder or seat 2 and an inner peripheral cylindrical wall 3.

A hemispherical cup or shell 4 is produced in known manner, preferably being stamped or pressed from thin sheet metal, the melting point of which is higher than that of the cast metal comprising hemisphere 1. For example, the casting 1, if of bronze, will have a melting point of approximately seventeen hundred degrees Fahrenheit and the shell 4, if of mold steel, about twenty seven hundred degrees Fahrenheit.

Figure 3:
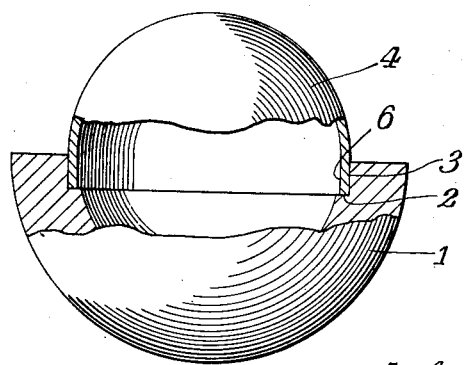
Fig. 3 is a similar view of the parts shown in Fig. 2, assembled.
Figure 4:
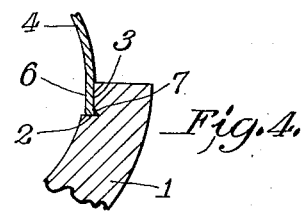
Fig. 4 is a sectional detail of a frictional fastening joint by which the shell is secured to the lower hemisphere of the ball.

The cup 4 is preferably provided with perforations constituting gas vents 5 of approximate diameter to permit gas to escape from the hollow ball, yet preventing molten metal from entering the ball. The cup, in the form shown in Figs. 2 to 5, has a cylindrical marginal portion 6 of diameter sized to make a snug push fit for affixing the cup by binding or locking its margin 6 against the cylindrical wall 3 when the edge of the shell is seated on shoulder 2, as shown in Figs. 3 and 4.

Various ways of securing the cast member 1 to the cup 4 may be employed of which typical examples are shown in Figs. 4, 6, 7, 8. In the structure shown in Fig. 4, a groove 7 may be formed by undercutting the metal of the wall 3, the edge of the cylindrical portion 6 being slightly bent or flared outwardly so as to snap into the groove 7. The inside radius of shell 4 is the same as the inside radius of the lower hemispherical casting 1. The two parts fitted together as shown in Fig. 3 present a smooth walled spherical chamber. The slight departure at 6, Figs. 1 to 5, and 7, from truly hemispherical shape is not sufficient to impair the practically correct balance of the completed ball. Nor does the presence of the thin shell 4 produce practical unbalance, since its specific weight is almost the same as that of the surrounding cast metal. The resultant cup-and-casting assembly shown in Fig. 3 is placed in a sand or other suitable mold, preferably as shown in Fig. 5. The bottom 8 of the mold may be shaped to receive the hemisphere 1. The top half or cope of the mold 9 has a cavity, the contour of whose inner wall is complemental to the outer contour of the hemispherical casting 1, and is placed over the lower part 8. Mold member 9 is provided in known manner with a gate 10 and an outflow pocket 11. Molten metal for the ball is poured into the gate 10, flows around the annular metal floor presented by the upper edge of hemisphere 1 and fills the space between the shell 4, and the wall of the mold cavity in the top half or cope of the mold thus forming the upper half 13 of the ball.

The hot metal expands the air within the ball and it escapes out through the perforations 5 and through the sand comprising the top half 9 of the mold, or if a metal mold is used similar arrangements for the escape of air are provided in it. The perforations 5 are so small, say, one sixty-fourth inch, that molten metal can not pass into the interior of the ball.

The temperature of the metal when poured is higher than the fusing temperature of the metal of the casting 1, but lower than the fusing temperature of the cup 4. As the first metal enters the mold it forms a stream that flows around the top annular face of the hemisphere 1 and overflows into a pocket 11, the size of which determines the amount of flow that shall pass over, and consequently the amount of heat that shall be applied to the top surface of the hemisphere 1 in order to form therewith a satisfactory fused union, indicated at 12, without melting the upper part of hemisphere 1 to such extent as would allow metal to escape into the ball by flowing underneath the wall 6 of shell 4. Overflow pocket 11 being filled and the upper face of casting 1 being preheated, the pouring of the upper hemisphere 13 is completed. After the casting 13 has cooled the sprue 10a and overflow metal 11a are cut off and the ball is then ground and polished in the usual way, removing all trace of the extra metal pieces 10a, 11a.

In Figs. 1 to 5 I have shown a preferred type of joint by which the margin of the thin hemispherical cup 4 is fastened to the interior face of the cast metal shell 1, and the foregoing description has been made with reference to that joint construction. The exact form of joint, however, is immaterial to my invention viewed in its broader aspect, and I, therefore, illustrate in Figs. 6, 7 and 8 certain modified forms of joint between parts 1 and 4.

Figure 6:
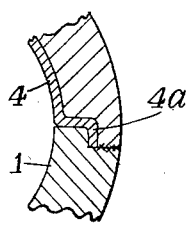
Figs. 6, 7 and 8 are sectional details showing modifications of the means by which the margin of the thin hemispherical cup is united to the cast metal shell.
Figure 8:
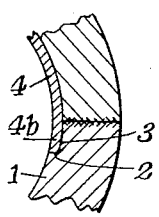

In Figs. 6 and 8 the cup 4 is shaped to present with the part 1 a truly spherical cavity, as distinguished from the slight offset formed in the structure of Fig. 3 by the cylindrical part 6. In Fig. 6 an outwardly and downwardly projecting flange 4a is provided on the cup 4 and in Fig. 8 the lower edge 4b of the cup is spun into spherical form instead of cylindrical as at 6 in Fig. 3.

Figures 5, 7, 9:
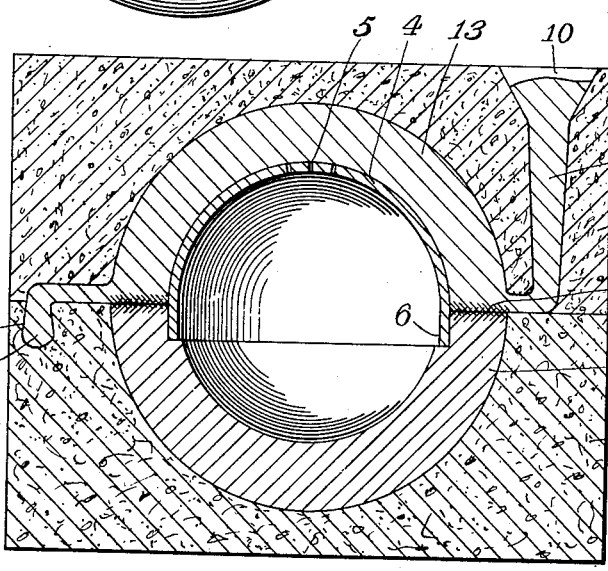
Fig. 5 is a sectional view of the cast ball as it appears prior to its removal from the mold.
Fig. 9 is a sectional detail showing a further modified form.

In Fig. 7 a cylindrical band of metal 4c is seated on the shoulder 2 and fastened to the inner wall 3 of the counterbore by means of a press fit, or otherwise, the upper edge of band 4c extending above the upper annular face of the hemispherical casting 1. The cup 4 is applied to the band 4c and quickly united to it by welding. If desired the band 4c can be fixed to the original casting 1 by placing the band 4c in the mold when the part 1 is cast.

Another modified form of joint is shown in Fig. 9, wherein instead of employing an initial hemispherical casting 1, as shown in the previous figures and affixing to it a hemispherical cup 4, two such cups 14, 14 are placed edge to edge, being preferably provided with conjoined flanges 14a projecting radially outward as shown.

A ring 15 of cast metal is poured around the flanges 14a. This assembly of the two cups and the ring is then used in the same way as has already been described for casting 1 and cup 4, the lower hemisphere 1a and the upper hemisphere 13a being cast thereon as shown in Fig. 9 so that the two annular faces of ring 15 are united to the two halves of the ball shown by the fusing together of the metals along the lines indicated in Fig. 9.

A ball made in the manner described, if placed on a level glass plate, will remain stationary, or practically so, demonstrating that its geometrical center and its center of gravity are identical, or nearly so, and that the ball is properly balanced.

It has already been noted that the thickness of the cast wall comprising the lower hemisphere 1 is the same as the thickness of the cast metal of the upper hemisphere plus the thickness of the sheet metal hemispherical shell 4. Consequently the two hemispheres are of the same weight, excepting for the very slight difference in density of the metal of shell 4 as compared with the layer of equal thickness of the cast metal. In practice such difference is negligible.

The lower half 1, having been cast in the usual way, the smoothness and concentricity of its concave interior can be checked before cup 4 is applied to it. The upper half 13, being formed around the accurately shaped sheet metal shell 4, provides an accurate interior shape for the upper half. Therefore, the smoothness and geometrical accuracy of the ball cavity is assured, and as no sand core is used in molding it, no core-removing holes are left in the shell and no core hole plugs are used. Welding, brazing or soldering operations are not employed, yet the finished article is seamless and smooth and clean inside, and quite accurately balanced.

The process and the article comprising my claimed invention have been described as related to the manufacture of a hollow cast metal ball that is required to be in rotating balance, but it will be understood that the invention as defined in certain of the claims is not restricted to articles of spherical shape. Without the exercise of further invention the present process may be used for the production from cast metal of variously shaped hollow articles whose conditions of use require them to be devoid of openings and seams, their interior space containing no loose foreign matter such as core sand, and their shell walls being of uniform thickness and presenting smooth inside surfaces. Such articles, instead of being spherical may be oval or of any other suitable shape. Certain claims are directed to the ball as an article of manufacture and certain other claims to the method of process by which the article is produced.

Having thus described my invention, what I claim and desire to secure by Letters Patent is:

1. Method of manufacturing from cast metal a hollow article devoid of seams, and openings comprising making a casting having a hemispherical cavity, enlarging the outer end of the cavity so as to form a shoulder and a counterbore, placing a hemispherical cup, made of sheet metal of higher melting point than that of the casting, on said shoulder and securing the rim margin of the cup to the wall of the counterbore, forming air vents in the cup, placing the cup in the cavity of a mold, the wall of said cavity being complemental to the outer contour of said casting, filling with molten metal the space defined by the cup, the mold cavity and the annular face of the casting, the temperature of the molten metal being higher than the fusing temperature of the casting, but less than the fusing temperature of the cup, allowing the material to cool, removing it from the mold and thereafter finishing the exterior face.

2. Method of manufacturing from cast metal a hollow article devoid of seams and openings comprising making a casting having a cavity, making a cup of thin metal of higher fusing point than that of the casting, of the same internal diameter as the casting and provided with air vents, securing the rim of the cup to the casting, placing the cup of the resulting cup and casting assembly in the cavity of a mold, the wall of said cavity being complemental to the outer contour of said casting, filling with molten metal the space defined by the cup, the wall of the mold cavity and the annular face of the casting, the temperature of the molten metal being higher than the fusing temperature of the casting, but lower than the fusing temperature of the metal of the cup.

3. Method of manufacturing from cast metal a hollow article devoid of seams and openings, comprising making a hollow casting, affixing thereto, in complementary relation to the inner marginal wall thereof, a thin cup made of metal fusible at a higher temperature than said casting, placing the resultant cup-and-casting assembly in a mold having a cavity the contour of whose inner wall is complemental to the outer contour of said casting, and filling said cavity with molten metal the temperature of which is higher than the fusing temperature of the metal of said casting, but lower than the fusing temperature of the cup.

4. The method of making a hollow spherical ball devoid of openings comprising, making a hemispherical hollow casting and forming in the inner wall thereof a counterbore presenting a shoulder, securely seating upon said shoulder within said counterbore the margin of a thin hemispherical cup made of metal the melting point of which is higher than that of said casting, placing the resultant cup-and-casting assembly in a mold having a cavity the contour of whose inner wall is complemental to the outer contour of said hemispherical casting, filling said cavity with molten metal the temperature of which is higher than the fusing temperature of the metal of said casting, but lower than the fusing temperature of the cup, allowing the molten metal to cool, removing the ball from the mold and thereafter finishing its exterior face.

5. Method of manufacturing from cast metal a hollow article devoid of seams and openings comprising making a hemispherical hollow ball of cast metal, fixing thereto a hemispherical cup made of sheet metal of higher melting point than that of the casting, the internal diameter of the cup being substantially the same as that of the said hemispherical ball, placing the cup in the cavity of a mold, the contour of whose inner wall is complemental to the outer contour of said hemispherical ball, filling with molten metal the space defined by the cup, the mold cavity and the annular face of the said casting, the temperature of the molten metal being higher than the fusing temperature of the casting, but less than the fusing temperature of the cup.

6. Method of manufacturing from cast metal a hollow article devoid of seams and openings, comprising making a hollow casting including an annular rim, affixing to the inner peripheral wall thereof a thin cup made of metal that is fusible at a higher temperature than said casting, placing the resultant cup-and-casting assembly in a mold having a cavity the contour of whose inner wall is complemental to the outer contour of said casting and filling said cavity with molten metal the temperature of which is higher than the fusing temperature of the metal of said casting but lower than the fusing temperature of the metal of said cup.

ARTHUR A. SCHUPP.